US006777006B2

United States Patent
Watanuki et al.

(10) Patent No.: US 6,777,006 B2
(45) Date of Patent: Aug. 17, 2004

(54) WATER FOR EXTRACTION OF COFFEE INGREDIENT

(75) Inventors: Aki Watanuki, Matsue (JP); Koichi Takinami, Matsue (JP)

(73) Assignee: Hoshizaki Denki Kabushiki Kaisha, Toyoake (JP)

(*) Notice: Subject to any disclaimer, the term of this patent is extended or adjusted under 35 U.S.C. 154(b) by 43 days.

(21) Appl. No.: 10/105,796

(22) Filed: Mar. 26, 2002

(65) Prior Publication Data

US 2003/0185940 A1 Oct. 2, 2003

(51) Int. Cl.[7] .............................. A23F 5/00; A23F 5/10; A23F 5/16
(52) U.S. Cl. ........................................ 426/66; 426/594
(58) Field of Search .................................. 426/594, 66

(56) References Cited

U.S. PATENT DOCUMENTS

| 4,076,855 | A | * | 2/1978 | Ryder et al. |
| 5,192,571 | A | * | 3/1993 | Levy |
| 6,453,799 | B1 | * | 9/2002 | Kown |

FOREIGN PATENT DOCUMENTS

| JP | 07184547 | * | 7/1995 |
| JP | 08173043 | * | 7/1996 |
| JP | 10137125 | * | 5/1998 |
| JP | 2001038357 | * | 2/2001 |

* cited by examiner

Primary Examiner—Anthony Weier
(74) Attorney, Agent, or Firm—Nixon & Vanderhye P.C.

(57) ABSTRACT

Water used for extracting coffee ingredient from roasted coffee beans in the form of electrolyzed alkaline water of pH 8 to pH 11.

2 Claims, 1 Drawing Sheet

WATER FOR EXTRACTION OF COFFEE INGREDIENT

BACKGROUND OF THE INVENTION

1. Field of the Invention

The present invention relates to water used for extracting coffee ingredients from roasted coffee beans and to the coffee beverage extracted from roasted coffee beans using the water.

2. Description of the Prior Art

If city service water, natural water, commercially available water or the like is used for extraction of coffee ingredients from roasted coffee beans, various coffee beverages are made that are different in concentration and taste in accordance with the extract conditions such as the kind of water, a temperature of the water and extraction time. Accordingly, selection of the water is important for adjustment of the concentration and taste of coffee beverages.

SUMMARY OF THE INVENTION

A primary object of the present invention is to provide water capable of extracting coffee ingredients from roasted coffee beans as effectively as possible in a short time and to provide flavorful coffee extracted from the roasted coffee beans with use of the water.

According to the present invention, there is provided water to be used for extracting coffee ingredients from roasted coffee beans in the form of electrolyzed alkaline water of pH 8 to pH 11. In preparation of the water, it is preferable that any chlorine component be eliminated from original water used for production of the electrolyzed alkaline water. The electrolyzed alkaline water used for extraction of coffee ingredients is useful to increase the extracted amount of coffee ingredients compared to that that achieved using conventional water.

According to an aspect of the present invention, there is also provided a coffee beverage of pH 5.0 to pH 5.2 extracted from roasted coffee beans with use of the electrolyzed alkaline water. In a sensory test, it has been evaluated that the coffee is prepared in a higher concentration and becomes easier to drink.

DESCRIPTION OF THE PREFERRED EMBODIMENT

Figure 1:
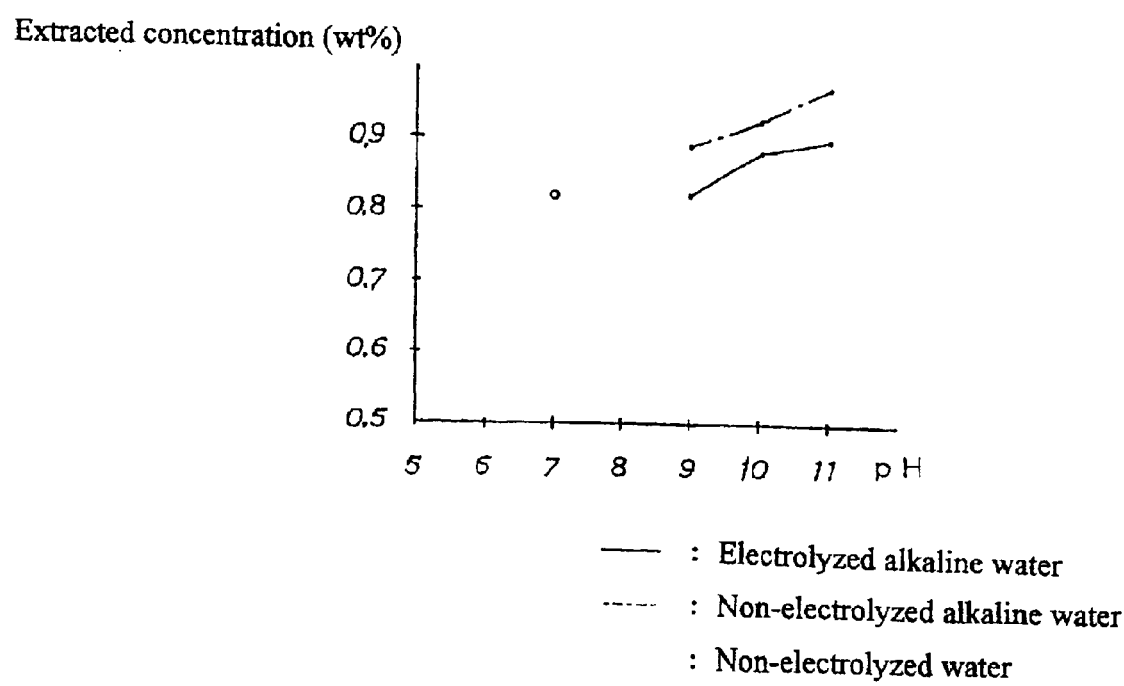
FIG. 1 is a graph showing a relationship between pH of water used for extraction of coffee ingredient and an extracted concentration of coffee.

An electrolyzed alkaline water according to the present invention, an electrolyzed acidic water, a non-electrolyzed water treated to eliminate chlorine components therefrom and a non-electrolyzed alkaline water adjusted in pH by addition of NaOH were used for the following experiments for extracting coffee ingredient from roasted coffee beans. In the following experiments, a sensory test was carried out to evaluate the taste of extracted coffee, and pH of extracted coffee and an extracted amount of coffee ingredient in the coffee were measured to evaluate each water in extraction effects of coffee ingredient.

Experiment 1

In this experiment, eight kinds of water such as electrolyzed alkaline water of pH 7.7, pH 8.9, pH 10.1, electrolyzed acidic water of pH 4.1, pH 5.1, non-electrolyzed water of pH 6.6 and non-electrolyzed alkaline water of pH 8.9, pH 10.0 were used to extract coffee ingredient from roasted coffee beans. The electrolyzed alkaline water, electrolyzed acidic water, non-electrolyzed water and non-electrolyzed alkaline water were prepared in such a manner as described below.

City service water purified by a water purifier and treated to eliminate chlorine components therefrom was electrolyzed by means of an electrolyzer to produce electrolyzed alkaline water of pH 7.7, pH 8.9, pH 10.1 in a cathode chamber and to produce acidic water of pH 4.1, pH 5.1 in an anode chamber. The city service water purified by the purifier and treated to eliminate chlorine components was used as the non-electrolyzed water of pH 6.6, and the city service water was adjusted in pH by addition of NaOH to produce the non-electrolyzed alkaline water of pH 8.9 . . . 0.01 mM, pH 10.0 . . . 0.1 mM. The characteristics of these waters are represented in the following table 1.

TABLE 1

| | Sample water | | | | | | | |
|---|---|---|---|---|---|---|---|---|
| Characteristic | Non-electrolyzed water | Electrolyzed acidic water | | Electrolyzed alkaline water | | | Non-electrolyzed alkaline water | |
| pH | 6.6 | 4.1 | 5.1 | 7.7 | 8.9 | 10.1 | 8.9 | 10.0 |
| Oxidation-reduction Potential(mV) | 382 | 536 | 400 | −17 | −170 | −486 | 221 | 173 |
| Electric conductive degree(mS/cm) | 0.168 | 0.176 | 0.172 | 0.173 | 0.183 | 0.196 | 0.175 | 0.193 |
| Remained chlorine concentration(mg/l) | 0 | 0.25 | 0.10 | >0.05 | >0.05 | >0.05 | 0 | 0 |
| Dissolved oxygen concentration(mg/l) | 6.84 | 9.81 | 8.97 | 6.98 | 6.76 | 5.71 | 6.87 | 6.82 |
| Na(mg/l) | 6.75 | 3.89 | 4.35 | 7.86 | 8.28 | 9.34 | 7.01 | 8.96 |
| K(mg/l) | 0.63 | 0.19 | 0.27 | 0.79 | 0.83 | 0.87 | 0.61 | 0.63 |
| Mg(mg/l) | 1.8 | 1.06 | 1.25 | 2.09 | 2.21 | 2.38 | 1.80 | 1.80 |
| Ca(mg/l) | 5.14 | 3.08 | 3.53 | 6.03 | 6.76 | 7.36 | 5.13 | 5.16 |

In this experiment, coffee beans made by Ajinomoto General Foods Kabushiki Kaisha (Maxim-top aromaarabica 100) were used for extraction of coffee ingredient. The coffee beans were roasted in a medium roast degree and ground in medium. The ground grains of the coffee beans were set in a coffee maker for domestic use to extract coffee ingredient in a usual manner. The extracted coffee was applied to a sensory test by eight panelists and a coffee connoisseur. A result of the sensory test is listed in the following tables 2 and 3.

Experiment 2

In the sensory test of the experiment 1, it has been evaluated that the coffee extracted with use of the electrolyzed alkaline water becomes thick in taste. It is, therefore, presumed that an extract amount of dissoluble component will differ in accordance with pH of the electrolyzed alkaline water. For this reason, an extract amount of dissoluble component was measured respectively in use of the non-electrolyzed water, electrolyzed alkaline water and non-

TABLE 2

| | Sample water | | | | | | |
|---|---|---|---|---|---|---|---|
| | Electrolyzed acidic water | | Electrolyzed alkaline water | | | Non-electrolyzed alkaline water | |
| Characteristic | | | | | | | |
| pH | 4.1 | 5.1 | 7.7 | 8.9 | 10.1 | 8.9 | 10.0 |
| Smell | Weak | Weak | Same | Same | Same | Weak | Weak |
| Bitterness | None | Same | Same | Slightly strong | Same | Same | Same |
| Acidity | Strong | Strong | Same | None | Same | Weak | None |
| Astringency | Same | Same | None | Same | Slightly strong | Same | Same |
| Color | Same | Slightly deep | Slightly deep | Deep | Deep | Dark black | Dark black |

TABLE 3

| | Sample water | | | | |
|---|---|---|---|---|---|
| | Electrolyzed alkaline water | | | Non-electrolyzed alkaline water | |
| Characteristc | | | | | |
| pH | 7.7 | 8.9 | 10.1 | 8.9 | 10.0 |
| Smell | Same | Same | Same | Weak | Weak |
| Bitterness | Same | Slightly strong | Same | Same | Same |
| Acidity | Same | None | Same | Weak | None |
| Astringency | None | None | Slightly strong | Same | Same |
| Synthetic evaluation | Easy for drink Same | Mellow Easy for drink Full-bodied Generally strong | Strong taste Better in balance of acidity and bitterness | Heavy taste Unlikable to coffee | Unlikable to coffee Boiled taste Unlike to usual coffee |

In the sensory test, the smell of coffee extracted with use of the electrolyzed acidic water became weak. From this fact, it has been evaluated that the electrolyzed acidic water is unsuitable for extraction of coffee ingredient. In use of the electrolyzed acidic water, it is presumed that the smell of coffee is noticeably influenced by an increase of chlorine component and dissolved oxygen more than that in use of the non-electrolyzed water or the electrolyzed alkaline water.

On the other hand, the coffee extracted with use of the electrolyzed alkaline water was full-bodied and became few in bitterness and astringency and mellow. From this fact, it has been evaluated that the electrolyzed alkaline water is suitable for extraction of coffee ingredient. In addition, the coffee extracted with use of the non-electrolyzed alkaline water was heavy in taste and unlike to usual coffee. From this fact, it has been evaluated that the non-electrolyzed alkaline water is unsuitable for extraction of coffee ingredient.

electrolyzed alkaline water. In this experiment, non-electrolyzed water, three kinds of electrolyzed alkaline water and non-electrolyzed alkaline water different in pH were used for extracting coffee ingredient. Coffee extracted in the same manner as in the experiment 1 was solidified by vapor dry. Thus, an extracted amount of coffee ingredient was calculated on a basis of a solidified amount of the coffee as shown in FIG. 1. As it has been found that the electrolyzed acidic water used in the experiment 1 is unsuitable for extraction of coffee ingredient, the electrolyzed acidic water was not used in this experiment.

As is recognized from a graph of FIG. 1, any difference in extracted concentration was not found between the electrolyzed alkaline water of pH 9 and the non-electrolyzed water of about pH 7. However, a significant difference in extracted concentration was found between the electrolyzed alkaline water of pH 10, pH 11 and the non-electrolyzed water.

Experiment 3

From such a result of the experiment 2 as described above, it has been found that the extraction of coffee ingredient is noticeably influenced by pH of the water. Based on this fact an experiment was carried out in a more precise manner than the experiment 2 to examine an influence of the extracted amount of dissoluble coffee ingredient to the taste of coffee.

In this experiment, the same coffee beans as used in the experiment 1 were used, and non-electrolyzed water of pH 6.6, electrolyzed alkaline water of pH 10.1 and non-electrolyzed alkaline water of pH 10.0 were used for extracting coffee ingredient from the coffee beans in a condition described below. 2.5 g of the sample grains of coffee beans was put into a glass funnel warmed at 85° C., and the water of 50 ml heated at 80° C. was put into the funnel to extract coffee ingredient from the sample grains of coffee beans. The extracted coffee was centrifuged at 12,000 g for ten minutes and filtrated by a filter of 0.45 μm in pore diameter. Thus, the filtrated coffee was measured in pH, concentration of solid content, a dissolved amount of protein, an amount of sugar and an amount of tannic acid as shown in the following table 4.

in use of the non-electrolyzed alkaline water when compared with those in use of the other water. This represents an increase in extracted amount of polymerized sugar and caramelized sugar. In use of the non-electrolyzed alkaline water, it is presumed that the coffee ingredient is noticeably influenced by not only pH of the water but also NaOH added to the water.

The amount of protein in the extracted coffee was measured by a protein assay and represented by a higher value in use of the electrolyzed alkaline water and the non-alkaline water when compared with that in use of the non-electrolyzed water. From this face, it is presumed that the solubility of protein is promoted by pH of the water used for extraction of coffee ingredient. In addition, the amount of sugar was represented by a higher value in use of the electrolyzed alkaline water when compared with those in use of the other water for extraction of coffee ingredient.

The tannic acid in the extracted coffee was measured by a tartaric acid-iron calorimetric method. Although the entire amount of tannic acid in 2.5 g of coffee is 0.11 g, the

TABLE 4

| | Sample water | | |
|---|---|---|---|
| Extracted coffee | Non-electrolyzed water (ph 6.6) | Electrolyzed alkaline water (pH 10.1) | Non-electrolyzed alkaline water (pH 10.0) |
| pH | 5.03 | 5.13 | 5.36 |
| Concentration of solid content (%) | 0.73 | 0.79 | 0.78 |
| Bricks % | 0.97 | 1.06 | 1.0 |
| Brown degree (O.D.420) | 0.205 | 0.223 | 0.365 |
| Dissoluble protein (mg/ml) | 0.34 | 0.41 | 0.42 |
| Sugar (g/l) | 1.40 | 1.58 | 1.45 |
| Tannic acid (mg/l) | 519 | 568 | 527 |

As shown in the table 4, the pH of the extracted coffee became different values in accordance with the water used for extraction of coffee ingredient. That is to say, the pH of the extracted coffee was 5.03 in use of the non-electrolyzed water and 5.13 in use of the electrolyzed alkaline water. However, in use of the non-electrolyzed alkaline water, the pH of the extracted coffee was 5.36 higher than that of usual coffee. For this reason, it is presumed that the coffee extracted with the non-electrolyzed alkaline water becomes dark black and different taste to usual coffee as evaluated in the sensory test.

In this experiment, the concentration of solid content in the extracted coffee was measured by vapor drying of the coffee and represented by different values in accordance with the water used for extraction of coffee gradient. That is to say, the concentration of solid content was low in use of the non-electrolyzed water and high in use of the electrolyzed alkaline water and the non-electrolyzed alkaline water. This tendency was similarly observed in the bricks percent of the extracted coffee measured by a sugar degree meter.

The brown degree of the extracted coffee was measured by an absorbance method and represented by a higher value extracted amount of tannic acid represents a higher value in use of the electrolyzed alkaline water when compared with those in use of the non-electrolyzed water and the non-electrolyzed alkaline water. From this fact, it is presumed that the extracted coffee is influenced by other factors than pH of the water used for extraction of coffee ingredient. As the surface tension of the electrolyzed alkaline water is lower than that of the non-electrolyzed water, it is presumed that the extract function of coffee ingredient is enhanced by the lower surface tension of the electrolyzed alkaline water.

What is claimed is:

1. Coffee beverages of pH 5.0 to 5.2 prepared by extracting roasted coffee beans with use of electrolyzed alkaline water of pH 8 to pH 11 produced by electrolysis of water treated to eliminate a chlorine component therefrom.

2. A method for preparing coffee beverages of pH 5.0 to 5.2 by extracting roasted coffee beans with use of electrolyzed alkaline water of pH 8 to pH 11 produced by electrolysis of water treated to eliminate a chlorine component therefrom.

* * * * *